US011544471B2

(12) United States Patent
Belém et al.

(10) Patent No.: US 11,544,471 B2
(45) Date of Patent: Jan. 3, 2023

(54) WEAKLY SUPERVISED MULTI-TASK LEARNING FOR CONCEPT-BASED EXPLAINABILITY (71) Applicant: Feedzai—Consultadoria e Inovação Tecnológica, S.A., Coimbra (PT)

(72) Inventors: Catarina Garcia Belém, Seixal (PT); Vladimir Balayan, Lisbon (PT); Pedro dos Santos Saleiro, Lisbon (PT); Pedro Gustavo Santos Rodrigues Bizarro, Lisbon (PT)

(73) Assignee: Feedzai—Consultadoria e Inovação Tecnológica, S.A.

( * ) Notice: Subject to any disclaimer, the term of this patent is extended or adjusted under 35 U.S.C. 154(b) by 0 days.

(21) Appl. No.: 17/461,217

(22) Filed: Aug. 30, 2021

(65) Prior Publication Data

US 2022/0114345 A1 Apr. 14, 2022

Related U.S. Application Data (60) Provisional application No. 63/154,557, filed on Feb. 26, 2021, provisional application No. 63/091,807, filed on Oct. 14, 2020.

(30) Foreign Application Priority Data

Aug. 26, 2021 (EP) .................................... 21193263
Aug. 26, 2021 (PT) ......................................... 117425

(51) Int. Cl.
*G06F 40/30* (2020.01)
*G06F 40/169* (2020.01)
(Continued)

(52) U.S. Cl.
CPC ............ *G06F 40/30* (2020.01); *G06F 40/169* (2020.01); *G06N 3/04* (2013.01); *G06N 3/08* (2013.01);
(Continued)

(58) Field of Classification Search
CPC ......... G06F 40/30; G06F 40/169; G06N 3/04; G06N 3/08; G06Q 40/02; G06Q 20/4016
See application file for complete search history.

(56) References Cited

U.S. PATENT DOCUMENTS 7,613,663 B1 11/2009 Commons
10,140,553 B1 11/2018 Vasisht
(Continued)

OTHER PUBLICATIONS

Xu et al. (Generating Visual and Semantic Explanations with Multi-task Network), published by Computer Vision—ECCV 2020 Workshops, Glasgow, UK, Aug. 23-28, 2020, pp. 1-17. (Year: 2020).*

(Continued)

*Primary Examiner* — Stephen S Hong
*Assistant Examiner* — Ahamed I Nazar
(74) *Attorney, Agent, or Firm* — Van Pelt, Yi & James LLP (57) ABSTRACT A labeling function associated with generating one or more semantic concepts is received. The received labeling function is used to automatically annotate an existing dataset with the one or more semantic concepts to generate an annotated noisy dataset. A reference dataset annotated with the one or more semantic concepts is received. A training dataset is prepared including by combining at least a portion of the reference dataset with at least a portion of the annotated noisy dataset. The training dataset is used to train a multi-task machine learning model configured to perform both a decision task to predict a decision result and an explanation task to predict a plurality of semantic concepts for explainability associated with the decision task.

21 Claims, 8 Drawing Sheets

(51) Int. Cl.
G06N 3/08 (2006.01)
G06N 3/04 (2006.01)
G06Q 40/02 (2012.01)
G06Q 20/40 (2012.01)

(52) U.S. Cl.
CPC ......... *G06Q 40/02* (2013.01); *G06Q 20/4016* (2013.01)

(56) References Cited

U.S. PATENT DOCUMENTS

| | | | |
|---|---|---|---|
| 10,628,834 B1* | 4/2020 | Agarwal | G06N 20/00 |
| 2002/0180805 A1* | 12/2002 | Chickering | G06Q 30/02 715/812 |
| 2003/0097320 A1 | 5/2003 | Gordon | |
| 2003/0185361 A1 | 10/2003 | Edwards | |
| 2008/0109392 A1 | 5/2008 | Nandy | |
| 2008/0115213 A1 | 5/2008 | Bhatt | |
| 2014/0052678 A1 | 2/2014 | Martinez | |
| 2015/0026027 A1 | 1/2015 | Priess | |
| 2015/0254555 A1* | 9/2015 | Williams, Jr | G06N 3/084 706/14 |
| 2017/0230404 A1* | 8/2017 | Ramos de Araujo | G06Q 20/4016 |
| 2019/0066111 A1* | 2/2019 | Bizarro | G06Q 20/4016 |
| 2019/0164057 A1 | 5/2019 | Doshi | |
| 2019/0354805 A1 | 11/2019 | Hind | |
| 2020/0005310 A1 | 1/2020 | Kumar | |
| 2020/0242626 A1* | 7/2020 | Agarwal | G06N 20/00 |
| 2021/0117507 A1* | 4/2021 | Carrier | G06F 40/30 |
| 2022/0114361 A1* | 4/2022 | Kale | G06V 30/413 |
| 2022/0114595 A1* | 4/2022 | Balayan | G06N 3/0454 |

OTHER PUBLICATIONS

Alvarez-Melis et al., "Towards Robust Interpretability with Self-Explaining Neural Networks", 32nd Conference on Neural Information Processing Systems, 2018.
Chen et al., "Train and You'll Miss It: Interactive Model Iteration with Weak Supervision and Pre-Trained Embeddings", Jun. 26, 2020.
Daniel C. Elton, "Self-explaining AI as an alternative to interpretable AI", Jul. 2, 2020.
Dehghani et al., "Fidelity-Weighted Learning", Published as a conference paper at ICLR 2018, May 23, 2018.
Fu et al., "Fast and Three-rious: Speeding Up Weak Supervision with Triplet Methods", Proceedings of the 27th International Conference on Machine Learning, 2020.
Ghorbani et al., "Towards Automatic Concept-based Explanations", 33rd Conference on Neural Information Processing Systems, 2019.
Go et al., "Twitter Sentiment Classification using Distant Supervision", 2009.
Hancock et al., "Training Classifiers with Natural Language Explanations", Aug. 25, 2018.
Kim et al., "Interpretability Beyond Feature Attribution: Quantitative Testing with Concept Activation Vectors (TCAV)", Proceedings of the 35th International Conference on Machine Learning, 2018.
Krasakis et al., "Semi-supervised Ensemble Learning with Weak Supervision for Biomedical Relation Extraction", Automated knowledge Vase Construction (2019).
Lundberg et al., "A Unified Approach to Interpreting Model Predictions", 31st Conference on Neural Information Processing Systems, 2017.
Mintz et al., "Distant supervision for relation extraction without labeled data", 2009.
Pang Wei Koh et al., "Concept Bottleneck Models", Jul. 19, 2020.
Panigutti et al., "Doctor XAI", An ontology-based approach to black-box sequential data classification explanations, Jan. 27-30, 2020.
Plumb et al., "Model Agnostic Supervised Local Explanations", 32nd Conference on Neural Information Processing Systems, 2018.
Ratner et al., "Data Programming: Creating Large Training Sets, Quickly", Jan. 8, 2017.
Ratner et al., "Snorkel: Rapid Training Data Creation with Weak Supervision", Nov. 28, 2017.
Ribeiro et al., "Anchors: High-Precision Model-Agnostic Explanations", Association for the Advancement of Artificial Intelligence, 2018.
Ribeiro et al., "Why Should I Trust You?", Explaining the Predictions of Any Classifier, Aug. 9, 2016.
Sebastian Ruder, "An Overview of Multi-Task Learning in Deep Neural Networks", Jun. 15, 2017.
Srivastava et al., "Joint Concept Learning and Semantic Parsing from Natural Language Explanations", Proceedings of the 2017 Conference on Empirical Methods in Natural Language Processing, pp. 1527-1536, Sep. 7-11, 2017.
Varma et al., "Snuba: Automating Weak Supervision to Label Training Data", Proceedings of the VLDB Endowment, vol. 12, No. 3., 2018.
Zafar et al., "DLIME: A Deterministic Local Interpretable Model-Agnostic Explanations Approach for Computer-Aided Diagnosis Systems", Jun. 24, 2019.
Zeng et al., "Distant Supervision for Relation Extraction via Piecewise Convolutional Neural Networks", Proceedings of the 2015 Conference on Empirical Methods in Natural Language Processing, pp. 1753-1762, Sep. 17-21, 2015.
Zhang et al., "A Survey on Multi-Task Learning", Jul. 27, 2018.
Bibal et al., "Legal requirements on explainability in machine learning." Artifical Intelligence and Law 29..2 (2021): 149-169. Jul. 30, 2020. Retrieved on Oct. 14, 2021 from <http://www.crid.be/pdf/public/8613.pdf>.
Hind et al., "TED: Teaching AI to explain its decisions." Proceedings of the 2019 AAAI/ACM Conference on AI, Ethics, and Society. 2019. Jan. 27, 2019. Retrieved on Oct. 14, 2021 from <https://dl.acm.oprg/doi/abs/10.11453306618.3314273>.

* cited by examiner

WEAKLY SUPERVISED MULTI-TASK LEARNING FOR CONCEPT-BASED EXPLAINABILITY

CROSS REFERENCE TO OTHER APPLICATIONS

This application claims priority to U.S. Provisional Patent Application No. 63/091,807 entitled TEACHING THE MACHINE TO EXPLAIN ITSELF USING DOMAIN KNOWLEDGE filed Oct. 14, 2020, which is incorporated herein by reference for all purposes.

This application claims priority to U.S. Provisional Patent Application No. 63/154,557 entitled WEAKLY SUPERVISED MULTI-TASK LEARNING FOR CONCEPT-BASED EXPLAINABILITY filed Feb. 26, 2021, which is incorporated herein by reference for all purposes.

This application claims priority to Portugal Provisional Patent Application No. 117425 entitled WEAKLY SUPERVISED MULTI-TASK LEARNING FOR CONCEPT-BASED EXPLAINABILITY filed Aug. 26, 2021, which is incorporated herein by reference for all purposes.

This application claims priority to European Patent Application No. 21193263.7 entitled WEAKLY SUPERVISED MULTI-TASK LEARNING FOR CONCEPT-BASED EXPLAINABILITY filed Aug. 26, 2021, which is incorporated herein by reference for all purposes.

BACKGROUND OF THE INVENTION

Machine learning (ML) involves the use of algorithms that improve automatically through experience and by the use of data. In ML, a model is built based on sample data, known as training data, in order to make predictions or decisions without being explicitly programmed to do so. ML models are able to learn and adapt by analyzing and drawing inferences from patterns in data. ML has been increasingly used to aid humans in making better and faster decisions in a wide range of areas, such as financial services and healthcare. However, it is difficult for humans to comprehend the rationale behind ML models' predictions, hindering trust in their decision-making. Thus, it would be beneficial to develop techniques directed toward making ML decisions more interpretable for humans.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A labeling function associated with generating one or more semantic concepts is received. The received labeling function is used to automatically annotate an existing dataset with the one or more semantic concepts to generate an annotated noisy dataset. A reference dataset annotated with the one or more semantic concepts is received. A training dataset is prepared including by combining at least a portion of the reference dataset with at least a portion of the annotated noisy dataset. The training dataset is used to train a multi-task machine learning model configured to perform both a decision task to predict a decision result and an explanation task to predict a plurality of semantic concepts for explainability associated with the decision task.

A framework based on a machine learning model that jointly learns a decision task and associated domain knowledge explanations (also referred to as a self-explaining machine learning model) is disclosed. This framework is tailored to human-in-the-loop domain experts that lack deep technical ML knowledge. The domain knowledge explanations are also referred to herein as semantic concepts, concepts, etc. These explanations/concepts can guide human domain experts' reasoning throughout their decision-making process. In some embodiments, the framework utilizes decision-makers' feedback associated with semantic concepts. An advantage of the framework is that both predictive accuracy and explainability can be continuously improved. Due to the high cost of manually labeling semantic concepts to train a self-explaining machine learning model, as described in further detail herein, in various embodiments, a weakly supervised or semi-supervised method that leverages legacy rule-based systems to automatically create multi-label training data is used.

An advantage of the techniques disclosed herein is increased confidence by humans in decisions made by artificial intelligence (AI) systems. This is achieved through explanations capable of conveying domain knowledge that reflects semantic concepts related to a task of a human-in-the-loop, which encodes information about domain experts' underlying reasoning when making decisions. Concept-based explainability concerns the generation of explanations in the form of high-level concepts that are more easily understood by humans. Such concepts are conceptual abstractions of the key ideas of the human rationale behind decision-making. This paradigm powers AI systems with the ability to convey domain knowledge in the form of explanations. Its familiarity and ease of recognition makes this paradigm particularly suitable for explaining model predictions in the context of human-AI systems. As described in further detail herein, the techniques disclosed herein solve several problems associated with ML/AI systems, including the problem of insufficient data to train ML models performing an explanation task (also referred to herein as an explainability task) as a result of (1) unavailability of concept-annotated datasets (e.g., in a tabular domain); and (2) impracticality of manually creating concept-annotated datasets due to high costs of doing so. In various embodiments, a weakly supervised or semi-supervised learning approach is used to solve the problem of insufficient training data to automatically create concept-annotated datasets.

As described in further detail below, a machine learning architecture that jointly learns a decision task and associated explanations is disclosed. By encoding ML interpretability architecturally, more robust and authentic explanations can be achieved. A hierarchical architecture guarantees that a decision is only calculated based on a semantic layer, which is advantageous for addressing the problem of ensuring that explanations are faithful (e.g., when using a surrogate model). Encoding ML interpretability architecturally also promotes the incorporation of additional domain knowledge when building the semantic explanations. In various embodiments, due to its flexibility and generalization capabilities, a neural network model is used. In various embodiments, a multi-label framework is utilized, which allows each data instance to be simultaneously associated with a multitude of concepts. For instance, in a medical diagnosis task, an example of multiple concepts association would be to associate the concepts "headache" and "high body temperature" to the prediction of the disease "flu".

The techniques disclosed herein solve the problems of concept label scarcity and jointly learning an explainability task and a decision task. In various embodiments, this is accomplished by generating (in a substantially automated manner with minimal human supervision, which is referred to herein as distant supervision, weakly supervised learning, semi-supervised learning, etc.) a large dataset of labels using specified rules and concepts (referred to herein as noisy labels) and combining the large dataset of noisy labels with a small dataset of human expert manually created labels (referred to herein as golden labels). Stated alternatively, a self-explainable machine learning model may be trained using a mixture of noisy labels from distant supervision and golden labels from manual annotations.

Figure 1A:
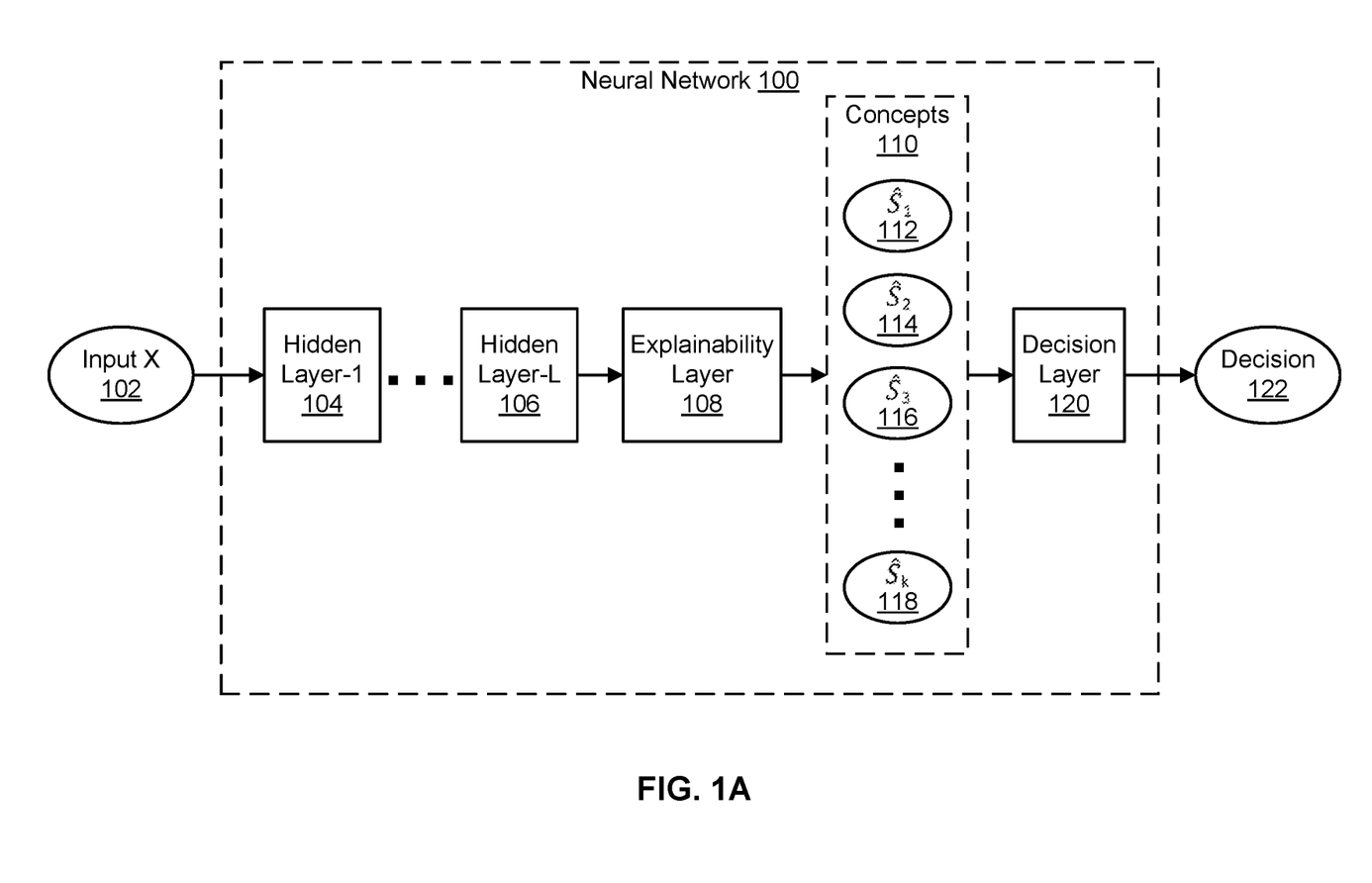
FIG. 1A is a block diagram illustrating an embodiment of a machine learning model architecture for performing both a decision task and an explanation task.

FIG. 1A is a block diagram illustrating an embodiment of a machine learning model architecture for performing both a decision task and an explanation task. In the example illustrated, neural network 100 receives input X 102 and outputs decision 122 related to a decision task. Neural network 100 also generates concepts 110, which correspond to an explanation task of producing semantic concepts 112, 114, 116, . . . , 118 used as explanations associated with the decision task. In various embodiments, concepts 110 is part of the output of neural network 100 (along with decision 122). As described in further detail below, in the example illustrated, concepts 110 are the input to decision layer 120 of neural network 100.

Neural network 100 is configured to jointly learn to perform a decision task and provide associated domain knowledge explanations. Semantic concepts (used as explanations) help domain experts (end-users) with reasoning related to their decision-making process. As described in further detail below (e.g., see FIG. 2), domain experts may provide feedback about which concepts justify their decisions. Thus, the techniques disclosed herein allow for continuously improving both predictive accuracy and explainability. In some embodiments, neural network 100 comprises a neural network (NN). This is merely illustrative and not restrictive. The techniques disclosed herein can also be implemented with different (or an ensemble of) machine learning models. For example, a multi-labeling ensemble model followed by a decision task model with the multi-labeling predictions as the only inputs to the decision task model may be utilized. Utilizing both semantic concepts and decision labels in a machine learning model can be framed as finding a hypothesis (learner), $h \in H$, such that, for the same inputs, $x \in X$, h is able to simultaneously satisfy $h: X \rightarrow Y$ and $h: X \rightarrow S$, where S is the set of semantic concepts, and Y is the set of decisions (or classes) of the decision task. The decision task is also referred to herein as the predictive task. The explanation task is also referred to herein as the explainability task.

In the example illustrated, neural network 100 comprises three building blocks: (1) neural network (NN) layers (hidden layer-1 104 to hidden layer-L 106), (2) a semantic layer (explainability layer 108), and (3) a decision layer (decision layer 120). In the example illustrated, neural network 100 is a hierarchical machine learning model in that the blocks are chained sequentially. Stated alternatively, outputs of an L-layer NN are fed as inputs to a semantic layer whose outputs are in turn fed into a decision layer. Both the decision task and the explainability task share parameters of the initial layers (the hidden layers) but also have specialized output layers for each individual task. The hierarchy shown in the output layers exploits the explainability task carrying pertinent information to the decision layer that is not explicit in the input data. In various embodiments, input X 102 is a vector X of numerical values. For example, with respect to fraud detection (an example application of the techniques disclosed herein that will be referred to repeatedly herein for illustrative purposes), X may comprise various values associated with a transaction to be determined (decided) as either fraudulent or not fraudulent (e.g., purchase amount for the transaction, total purchase amounts for other transactions by a same purchaser in a specified period of time, time between recent purchases, etc.). Non-numerical features may be converted to numerical values and included in input X 102. For example, whether a billing address associated with the transaction matches a known billing address on file can be represented as 0 for no and 1 for yes. It is also possible for input X 102 to include non-numerical values, such as the billing address. In various embodiments, each layer of neural network 100 (e.g., hidden layer-1 104 through hidden layer-L 106, explainability layer 108, and decision layer 120) is a structure that takes information from a previous layer and/or passes information to a next layer. Various types of neural network layers may be used, such as fully-connected layers with rectified linear unit (ReLU) or other activation functions. In various embodiments, in addition to decision 122 (which can be written as $\hat{Y}$) provided by neural network 100 as an output of decision layer 120, concepts 110 (which can be written as $\hat{S}$) are also provided by neural network 100 as outputs of explainability layer 108.

With respect to fraud detection, an example of decision 122 is an output that includes a score between 0.0 and 1.0, which can then result in a 0 or 1 output based on a score threshold. This can be interpreted as a yes or no determination as to whether a particular transaction is likely to be fraudulent. In the example shown, concepts 110 are comprised of a plurality of semantic concept predictions $\hat{S}_1$ 112, $\hat{S}_2$ 114, $\hat{S}_3$ 116, ... $\hat{S}_k$ 118. With respect to fraud detection, each semantic concept prediction may be a score between 0.0 and 1.0 representing a probability of a specific fraud concept being present, such as suspicious billing address, suspicious customer, suspicious payment, suspicious items, high speed ordering, suspicious email, suspicious Internet Protocol (IP) address, and so forth. Predictive scores (e.g., likelihood scores between 0.0 and 1.0) can result in yes or no determinations based on score thresholds. In some embodiments, each yes or no determination is based on whether a corresponding likelihood score exceeds a specified threshold (e.g., 0.5 on a scale of 0 to 1). The example illustrated is a multi-task machine learning model because in addition to predicting a decision result (e.g., a determination that fraud exists/is likely), semantic concepts associated with explaining the decision result (e.g., suspicious billing address, suspicious customer, suspicious payment, etc., to explain why fraud is likely). By chaining semantic and decision layers (explainability layer 108 and decision layer 120), external information about the domain (e.g., fraud detection) which is not available in the feature data (input X 102) can be encoded. This is particularly meaningful when the taxonomy of semantic concepts is closely related to the decision task (e.g., a fraud taxonomy of fraudulent patterns can be very correlated with the fraud detection task). Therefore, learning to accurately predict the domain concepts can be very advantageous with respect to end-task predictions and end-user decisions.

In various embodiments, neural network 100 is trained using backpropagation and a gradient descent method. In various embodiments, a joint learning approach attempts to minimize both a decision loss, $L_D$, and an explanation loss, $L_E$. Given model parameters $\theta=[\theta_1, \theta_2, \ldots \theta_L, \theta_S, \theta_D]$, the outputs of the decision layer, $\delta_D(x,\theta)$, and the outputs of semantic layer, $\delta_S(x,\theta)$, the output of the gradient with respect to the loss, L, at the semantic layer is given by $\nabla_{\delta_S}L(x,y,s)=\nabla_{\delta_S}L_D(\delta_D(x,\theta),y)+\nabla_{\delta_S}L_E(\delta_S(x,\theta),s)$ (Equation 1), where $$\nabla_{\delta_S} L_D(\delta_D(x, \theta), y) = \frac{\partial \delta_D(x, \theta)}{\partial \delta_S} \cdot \nabla_{\delta_D} L_D(\delta_D(x, \theta), y).$$ (Equation 2)

Various types of loss functions can be used. Which loss functions to use depends on the nature of the task. As the semantic task corresponds to a multi-labeling task, in some embodiments, a sigmoid function is used and applied to each individual entry of the output before using it in the loss function. To find a mapping that simultaneously satisfies satisfy h:X→Y and h:X→S for a given input vector, x∈X, in some embodiments, the (categorical) cross-entropy is mutually minimized for both tasks. Thus, for an input vector, x∈X, a set of domain concepts, s∈S, and decision labels, y∈Y, decision task and explanation task loss functions can be formulated as: $L_D(x,y)=-\Sigma_{i=1}^{|Y|}y_i \log[\text{softmax}(\delta_D(x,\theta)_i)]$ (Equation 3) and $L_E(x,s)=-\Sigma_{i=1}^{|S|}s_i \log[\text{sigmoid}(\delta_S(x,\theta)_i)]$ (Equation 4), respectively. Decision task loss and explanation task loss can be combined into a combined loss in which weights for decision task loss and explanation task loss can be adjusted: $L=\alpha*L_D+(1-\alpha)*L_E$ (Equation 5), where $\alpha \in [0, 1]$, e.g., $\alpha=0.5$ corresponds to equal weighting of decision task loss and explanation task loss.

Figure 1B:
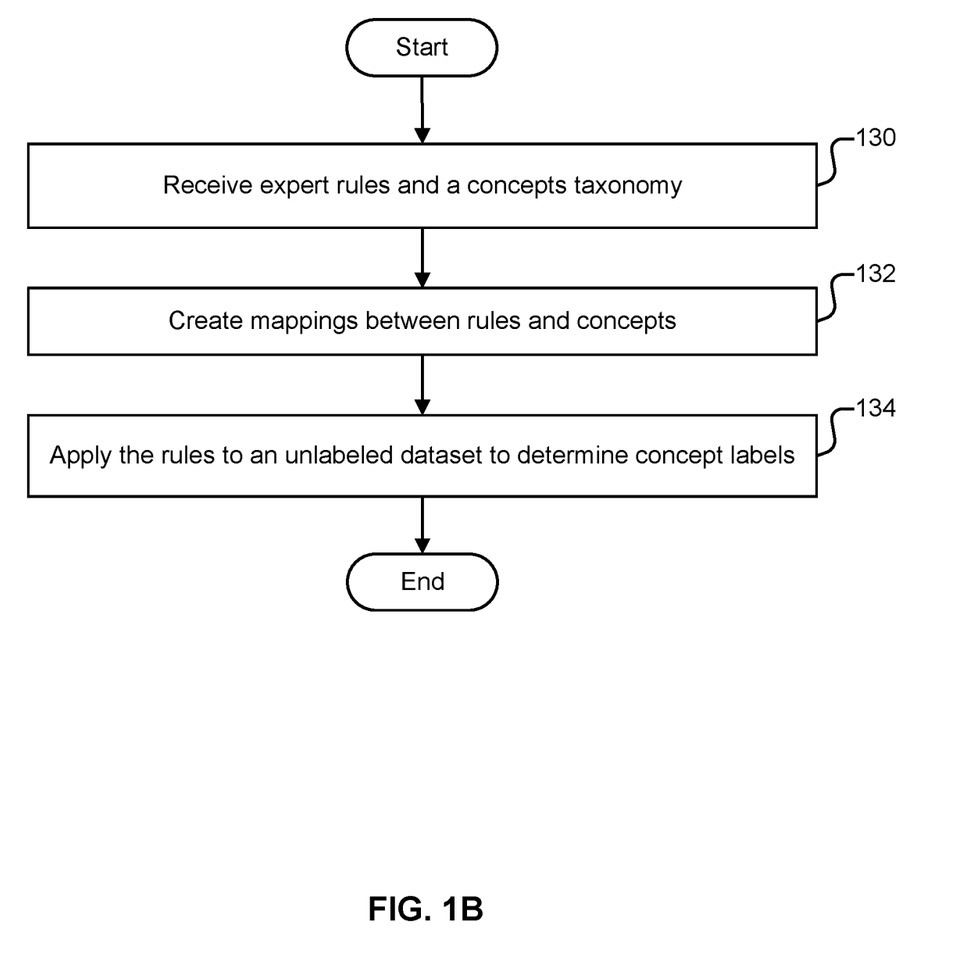
FIG. 1B is a flow diagram illustrating an embodiment of a process for training a machine learning model using distant supervision.

FIG. 1B is a flow diagram illustrating an embodiment of a process for training a machine learning model using distant supervision. In some embodiments, the process of FIG. 1B is utilized to train neural network 100 of FIG. 1A, machine learning model 204 of FIG. 2, and/or machine learning model 320 of FIG. 3. In some embodiments, the process of FIG. 1B is performed by computer system 700 of FIG. 7.

At 130, expert rules and a concepts taxonomy are received. The expert rules and the concepts taxonomy form a rule-concept mapping framework to automatically associate rules to concepts of the concepts taxonomy. In various embodiments, a human specialist (e.g., domain expert) devises the concepts taxonomy with all the relevant concepts for a specific task. These concepts closely reflect the human specialist's reasoning process when performing the task and therefore are perceived as suitable explanations. In various embodiments, a human specialist also reviews the rules. In various embodiments, the rules are applied to features of input data.

At 132, mappings between rules and concepts are created. In various embodiments, these mappings are devised by one or more human specialists (e.g., domain experts). As a specific example, with respect to fraud detection, an example rule-to-concept mapping may be mapping the rule "user has used N different credit cards last week" to the concept "suspicious customer". In this example mapping, the concept of "suspicious customer" can be part of a suitable explanation by a human expert as to why a transaction may be fraudulent when the human expert is performing the task of fraud detection. In various embodiments, the concepts taxonomy is formed by a plurality of concepts that cover different cues, signals, reasons, etc. associated with explaining a prediction of a predictive task.

At 134, the rules are applied to an unlabeled dataset to determine concepts labels. Due to the rule-to-concept mappings in place, applying the rules to unlabeled data generates concept labels for the unlabeled data. Stated alternatively, specified data patterns trigger the rules, whose correspondingly linked concepts can be attached to the data patterns as labels. In various embodiments, such an approach is utilized to generate concept labels for machine learning model training data to overcome the concept label scarcity problem.

Figure 2:
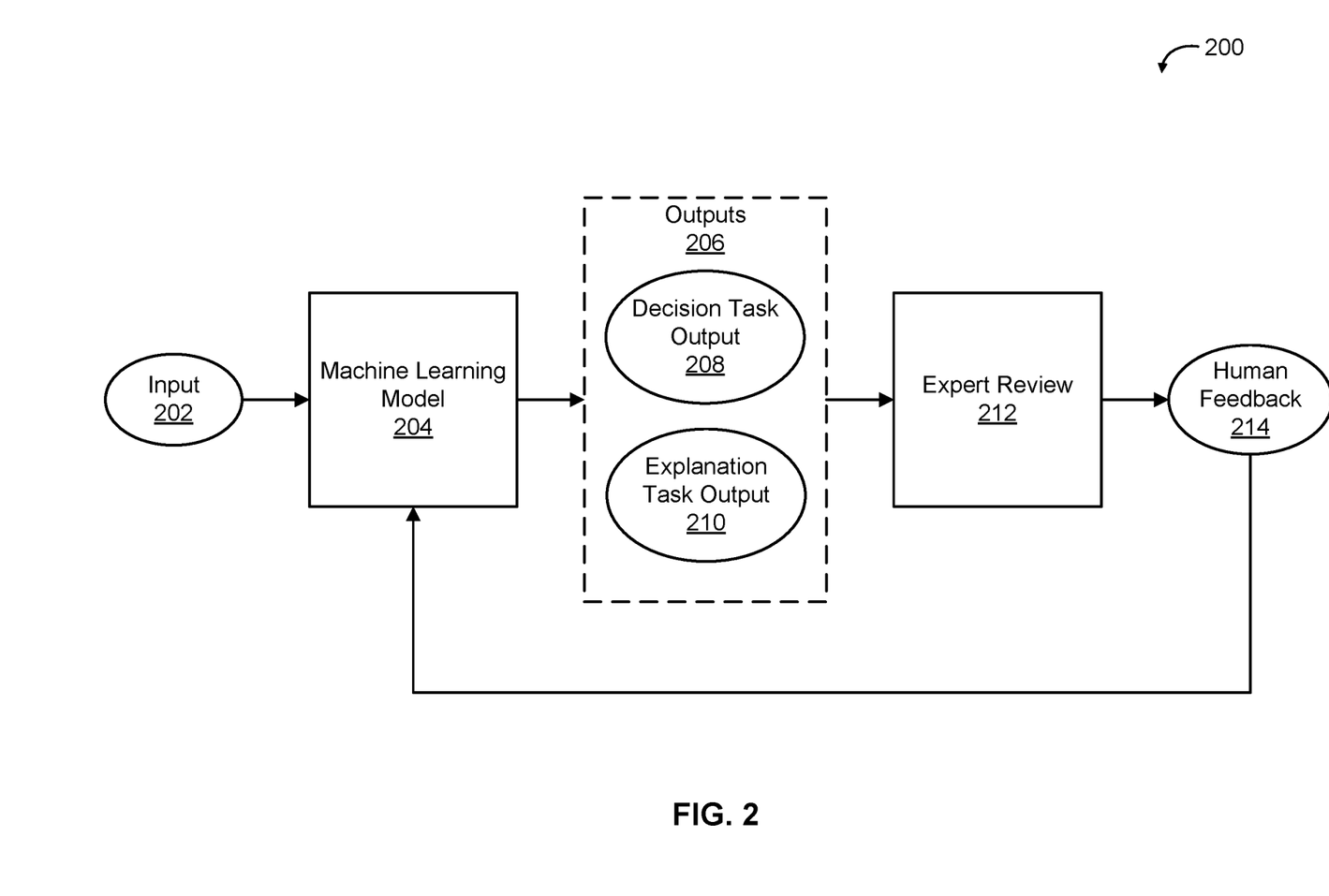
FIG. 2 is a diagram illustrating an embodiment of a feedback loop incorporating human teaching into a multi-task machine learning model.

FIG. 2 is a diagram illustrating an embodiment of a feedback loop incorporating human teaching into a multi-task machine learning model. In the example illustrated, feedback loop 200 includes machine learning model 204 and expert review 212. In some embodiments, machine learning model 204 is comprised of neural network 100 of FIG. 1A. In the example shown, machine learning model 204 receives input 202. In some embodiments, input 202 is input X 102 of FIG. 1A. Machine learning model 204 produces outputs 206, which include decision task output 208 and explanation task output 210. In some embodiments, decision task output 208 corresponds to decision 122 of FIG. 1A and explanation task output 210 corresponds to concepts 110 of FIG. 1A. In the example illustrated, and as described in further detail below, outputs 206 are reviewed by one or more humans at expert review 212. Expert review 212 generates human feedback 214, which is fed back to machine learning model 204 to train machine learning model 204. Examples of human feedback 214 are described below.

An advantage of feedback loop 200 is that machine learning model 204 is able to promptly adapt to human teaching (or tuning), as opposed to a uni-directional ML system that directly influences human decisions but does not allow for the reverse of adapting to human behavior. Oftentimes, uni-directional systems are offline and it is only after a certain period of time that a new model is trained and adapted to collected knowledge. Such limitations are solved by incorporating a human-teaching stage that continuously integrates expert feedback into the learning process. For example, machine learning model 204 may be configured to perform a fraud detection task in which a main goal is to classify financial transactions as being fraudulent or not. Thus, input 202 would include features associated with financial transactions pertinent to the fraud detection task. After receiving transaction information via input 202, machine learning model 204 may infer predictive scores for both a fraud label (decision task output 208) and semantic concepts associated with fraud patterns (explanation task output 210). A fraud analyst (e.g., a domain expert) can review the transaction at expert review 212 and indicate whether the fraud label and semantic concepts have been correctly decided by machine learning model 204. In some embodiments, expert review 212 includes a programmed computer system (e.g., computer system 700 of FIG. 7) that the domain expert utilizes to perform expert review. With respect to fraud detection, examples of human feedback 214 include checks on whether ML model determinations (e.g., yes or no determinations) and/or associated prediction scores (e.g., on a scale from 0 to 1) associated with semantic concepts such as suspicious billing address, suspicious customer, suspicious payment, suspicious items, high speed ordering, suspicious email, suspicious IP address, etc. are accurate. For example, the domain expert may select "accurate" or "not accurate" in a user interface.

In many real-world settings, human expertise aims to disambiguate inputs for which a model is uncertain. In these cases, the techniques disclosed herein can exploit this short-term feedback to improve human-AI system performance. In various embodiments, machine learning model 204 employs a hierarchical structure (e.g., with a semantic layer also acting as embeddings for a decision layer, such as is shown in neural network 100 of FIG. 1A) that is likely to encode additional information based on this feedback, which has a benefit of rapidly improving both predictive accuracy and also quality of explanations. In some embodiments, human feedback 214 is collected for a plurality of data instances (e.g., transactions) and then fed back to machine learning model 204 for model training. State alternatively, a batch training mode may be employed.

In various embodiments, prior to utilizing feedback loop 200, machine learning model 204 is trained to perform the explanation task using a bootstrapping technique (also referred to herein as distant supervision, a weakly supervised technique, semi-supervised technique, etc.) that uses an initial concept-based annotated dataset. At this stage, hyperparameters of machine learning model 204 may be tuned and the resulting model is then deployed in a human teaching stage via feedback loop 200 in which machine learning model 204 outputs decisions and explanations and collects human feedback regarding the outputted decisions and explanations. In various embodiments, after a specified number of human feedback instances, parameters of machine learning model 204 are updated through backpropagation. In some embodiments, quality control is incorporated into expert review 212. For example, each human expert may be required to meet a minimum accuracy level (or other relevant quantitative measure). Additionally, different experts may be utilized to review different semantic concepts (e.g., experts assigned based on their different areas of expertise). Feedback from specific experts (e.g., with higher accuracy levels or other relevant quantitative measures) may be assigned more weight (e.g., more training weight for higher impact on training of machine learning model 204).

In various embodiments, concept-based annotated datasets are created based at least in part on utilizing an automated rules-based system. In various embodiments, a distant supervision technique is utilized to derive an initial concept-based annotated dataset based on mapping rules to concepts in a taxonomy of concepts. A taxonomy of concepts (also referred to as a concept taxonomy) represents cues, signals, reasons, etc. associated with a predictive task (e.g., see FIG. 1B above). In various embodiments, human effort is required to create the mappings. This amount of effort, though, is negligible when compared with the effort of manually annotating a large dataset. As an example, consider a fraud prevention domain involving a rule legacy system. Using similarities between the domain knowledge conveyed in the rules, rule-concept mappings to automatically associate rules to concepts in a fraud taxonomy can be constructed. After validation of the mappings by a fraud expert, the mappings can be utilized to automatically label payment transactions in bulk. For example, consider a payment transaction X for which the legacy system triggers two rules, rule A and rule B. Suppose that according to a predefined rule-concept mapping, rule A maps to a "suspicious email" concept and rule B maps to "suspicious IP", "suspicious customer", and "suspicious payment" concepts. Thus, by applying a distant supervision technique, transaction X is annotated with "suspicious email", "suspicious IP", "suspicious customer", and "suspicious payment". Other rules may be triggered for other transactions. An example of rule A (associated with a suspicious email) is an email that exceeds a specified length, has a suspicious IP domain, or has another feature that indicates the email is suspicious. Many fraud prevention systems include various legacy system rules that can be applied to fraud datasets and leveraged for rule-concept mappings. Alternatively, rules may be created specifically to derive concept labels and applied to fraud datasets to generate concept labels for transaction data instances. Based on a few rule-based predictors available off-the-shelf in historical data accumulated by deployed AI models, it is possible to automatically generate concept-based annotations for datasets with many (e.g., millions of) instances. Although these annotations are likely to be imprecise (also referred to as weak, noisy, etc.) due to a lack of expert human involvement, these noisy annotations overcome the concept label scarcity problem of not having initial concept-based annotations and can be utilized to bootstrap model training and allow for subsequent fine-tuning using a small human-labeled (golden) dataset. Various training strategies incorporating the small human-labeled dataset are possible (e.g., see FIG. 3).

The techniques disclosed herein solve the problem of machine learning models (e.g., neural networks) requiring large amounts of training data (particularly for multi-label performance) that are difficult to collect and/or create for explanation tasks. Stated alternatively, manual creation of concept-annotated datasets based on semantic concepts is not feasible in many practical settings. Concept-based explainability can be challenging due to a lack of annotations and/or mechanisms to collect them. Small labeling campaigns oftentimes prove to be insufficient (e.g., too small, poor concepts coverage, etc.) for training machine learning models. The creation of human (golden) labeled datasets is an arduous and expensive task irrespective of the application domain. As a consequence, many AI practitioners can only afford a small fraction of manually-curated data.

Figure 3:
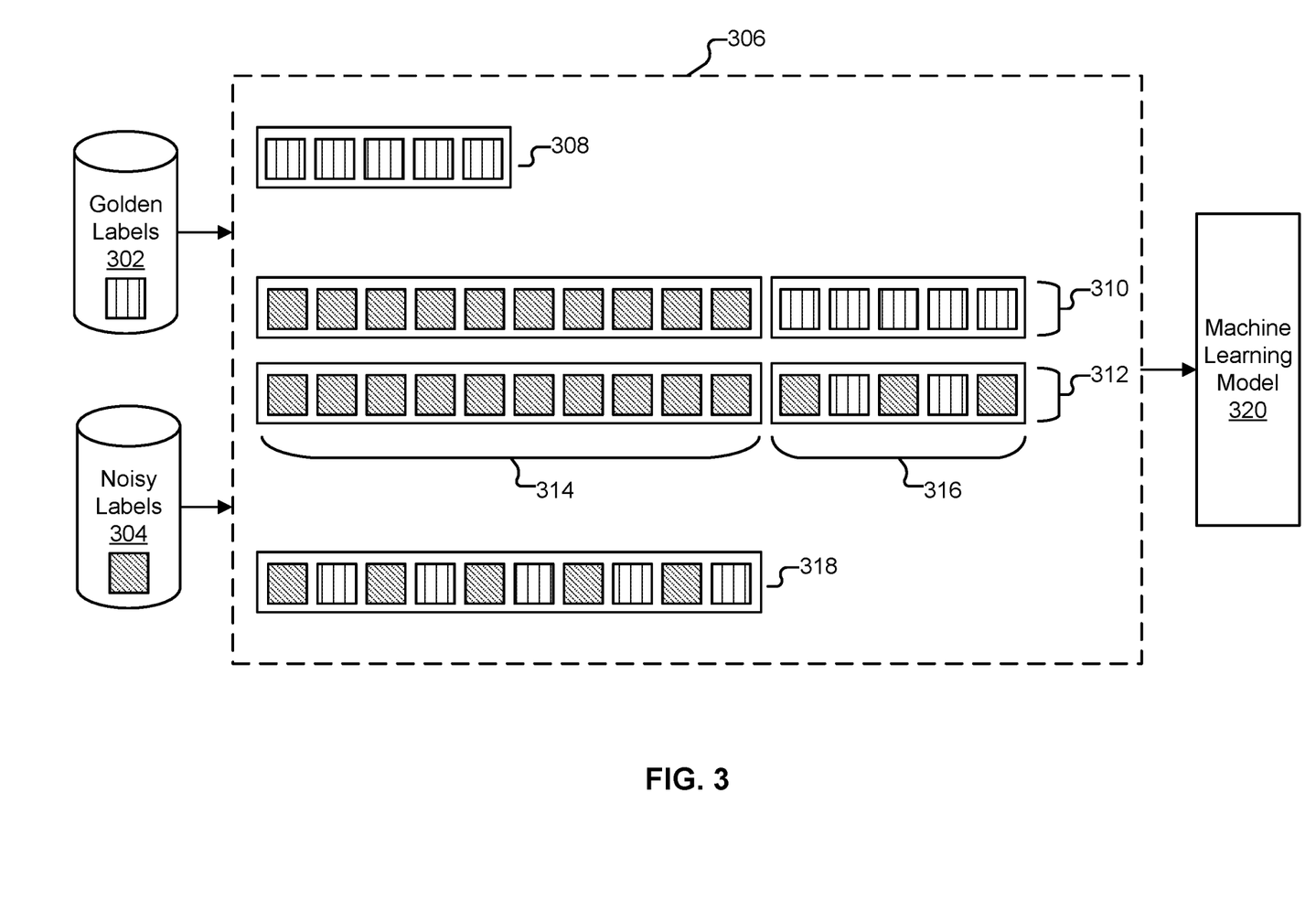
FIG. 3 is a diagram illustrating examples of approaches for training a multi-task machine learning model to perform both a decision task and an explanation task.

FIG. 3 is a diagram illustrating examples of approaches for training a multi-task machine learning model to perform both a decision task and an explanation task. In the example illustrated, golden labels 302 and/or noisy labels 304 are used according to one of a plurality of training strategies 306 to train machine learning model 320 to perform the explanation task. In some embodiments, machine learning model 320 is neural network 100 of FIG. 1A and/or machine learning model 204 of FIG. 2. In various embodiments, machine learning model 320 is configured to perform a detection task as well as the explanation task.

Golden labels 302 and noisy labels 304 are utilized to train machine learning model 320 to perform an explanation task (e.g., generate semantic concepts associated with fraud detection) as well as a decision task. The training may be an initial training, pre-training, re-training, fine-tuning, etc. With respect to fraud detection, golden labels 302 and noisy labels 304 may be fraud concept annotations for purchase transactions (e.g., suspicious billing address, suspicious customer, suspicious payment, suspicious items, high speed ordering, suspicious email, suspicious IP address, etc.). Thus, training instances for machine learning model 320 can include for each transaction of a plurality of transactions, a label as to whether a transaction is fraudulent and a plurality of labels (either golden labels 302 or noisy labels 304) as to whether the transaction matches one or more of a plurality of fraud concepts. In some embodiments, at least a portion of golden labels 302 is derived from human feedback 214 of FIG. 2. It is also possible for at least a portion of golden labels 302 to be derived from expert review that is not associated with running a machine learning model in inference mode (e.g., before the machine learning model is deployed).

Golden labels 302 refer to concept labels that are manually created by humans (also referred to as ground truth labels), which are presumed to be more accurate than noisy labels 304, which refer to concept labels that are at least in part automatically created. With respect to fraud detection, in some embodiments, golden labels 302 are created including by requesting fraud experts to evaluate fraud patterns (or legitimate transaction patterns) perceived for a plurality of transactions by selecting concepts from a pool of concepts determined in a fraud taxonomy. With respect to fraud detection (a particular example), fraud experts are also utilized to create the fraud taxonomy. In the fraud taxonomy, semantically, concepts refer to patterns involving specific information about transactions. For example, the concept "suspicious billing shipping" aims to guide a human's attention to information associated with shipping or/and billing information and prompt the human to examine dubious aspects, such as a mismatch between addresses, malformed addresses, etc. In general, domain experts create a concept taxonomy comprising semantic/ontological concepts that help describe patterns that contribute to an end decision.

In various embodiments, a distant supervision technique is utilized to automatically create noisy labels 304. In some embodiments, already existing information of a legacy rule system (that encoded high-level domain information) is extracted and mapped into the concepts (referred to as rule-concept mapping). In various embodiments, domain specialists (human experts) supervise this mapping. With respect to fraud detection, the result is a multi-label dataset in which each transaction instance is jointly associated with a fraud label (decision task) and fraud patterns (semantic concepts). Given that these annotations are proxies of ground truth associated concepts, they are referred to as "noisy labels". Distant supervision is utilized to heuristically extract imprecise proxy annotations for the concepts. In various embodiments, mappings of rules to concepts are validated by domain experts for correctness. With respect to fraud explainability, an example of a mapping is the rule "user tried N different credit cards last week" to the concept "suspicious customer" and/or the concept "suspicious payment". A single rule may be linked with more than one concept, as illustrated in the above example. Distant supervision allows for bulk annotation of large (pre-existing) data volumes, thus allowing for fast creation of multi-label datasets. Despite still requiring human effort to create these associations, the total human effort is negligible when compared with the effort for manual annotation of the same volume of data.

In the example illustrated, it is possible, via approach 308, to train machine learning model 320 to perform an explainability task using only golden labels 302. However, a disadvantage of approach 308 is that it is difficult to generate enough golden labels to effectively train machine learning model 320 (e.g., resulting in poor concepts coverage). Approaches that utilize both golden labels 302 and noisy labels 304 are described below.

In the example illustrated, approaches 310 and 312 are two-stage bootstrap approaches to training machine learning model 320 to jointly learn an explainability task and a decision task. In the example shown, training is separated into two sequential stages: stage 314 (a pre-training stage) and stage 316 (a fine-tuning stage). Stage 314 comprises training a base model using noisy labels 304, which are abundant due to how they are generated (automatically) but are less precise than manually generated golden labels 302. Stage 316 comprises fine-tuning the base model with either just golden labels 302 (approach 310) or a mixture of golden labels 302 and noisy labels 304 (approach 312). Stated alternatively, approaches 310 and 312 involve learning a model's parameters on a related dataset (the noisy dataset) and using it to obtain a better performing model on a smaller target dataset (the at least in part human-labeled dataset). In some embodiments, initial layers of machine learning model 320 are frozen and only task-specific layers are adjusted during stage 316. This can aid in preventing performance decay associated with discarding previous information and unlearning the decision task that machine learning model 320 is configured to perform, which may occur if golden labels 302 and noisy labels 304 are drawn from different distributions. Performance decay may also occur from using a learning rate value that causes steep updates, or iterating for many epochs, which can be too aggressive and cause machine learning model 320 to unlearn the traditional decision task. In some embodiments, stage 316 occurs after machine learning model 320 is deployed (e.g., subsequent to collecting golden labels via feedback loop 200 of FIG. 2). It is also possible for stage 316 to occur before machine learning model 320 is deployed (e.g., when golden labels are collected before machine learning model 320 is deployed). In various embodiments, stage 314 occurs before machine learning model 320 is deployed.

In the example illustrated, approach 318 is another approach that utilizes both golden labels 302 and noisy labels 304. Approach 318 (also referred to herein as a hybrid approach) involves a single training stage using mixed batches of labels, partly golden and partly noisy. Depending on the application, potential advantages over a two-stage approach include reduced bias in the base model and gradient updates that tend to be more informative and less prone to capturing noise. In various embodiments, approach 318 is employed before machine learning model 320 is deployed. The approaches shown are illustrative and not restrictive. Various modifications are possible. For example, it is possible to perform fine-tuning after approach 318 is employed. It is also possible to perform any number of re-training sessions for machine learning model 320.

With respect to fraud detection, an example of a training dataset is a dataset with millions of payment transactions of which a small percentage (e.g., 2-3%) are fraudulent and each transaction includes purchase information (e.g., number of items, shipping address, etc.), a fraud decision label, as well as information about triggered rules. Based on the information about triggered rules, a distant supervision technique can be applied to obtain noisy explainability labels (e.g., noisy labels 304). In some embodiments, a portion of the noisy labels are filtered out (not used) based on experimental results on how well the noisy labels match ones produced by humans. With respect to fraud detection, in various embodiments, a much smaller subset of the dataset (e.g., <1% of the entire dataset) may have human-annotated labels for the explainability task (e.g., golden labels 302). In some embodiments, golden labels are reviewed for human error. Typically, all labels for the fraud decision task are golden and can be described as golden decision labels, whereas the explainability task spans both a high-resources noisy explainability dataset and a low-resources golden explainability dataset. Both golden labels and noisy labels can be utilized for training, validation, and testing for the explainability task.

In some embodiments, for training strategies 306, a first hyperparameter grid search is executed in which various hyperparameters, e.g., batch size, learning rate, number and dimension of hidden layers, value of a in Equation 5 (controlling the importance of the explainability task relative to the decision task), etc., are varied and resulting models are evaluated. Models are evaluated in terms of their predictive performance at the traditional decision task and the explainability task. With respect to fraud detection, the decision task may be evaluated according to fraud recall (rate of detecting fraud when fraud exists). The explainability task may be evaluated according to a mean Average Precision (mAP) metric, which focuses on the number of correctly predicted concepts without imposing restrictions on the explanation size (how many concepts each explanation should have). In various embodiments, the first hyperparameter grid search is applicable to approach 308, approach 318, and stage 314 of approaches 310 and 312. In various embodiments, a second hyperparameter grid search is executed during stage 316 for approaches 310 and 312. In various embodiments, for the second hyperparameter grid search, the number of epochs, batch size, number of frozen layers, and learning rate are varied. Additionally, each mini-batch may be enforced to have at least one transaction per concept and the fraction of fraudulent transactions per batch may be fixed to be equal to the fraud prevalence of the training dataset.

Figure 4:
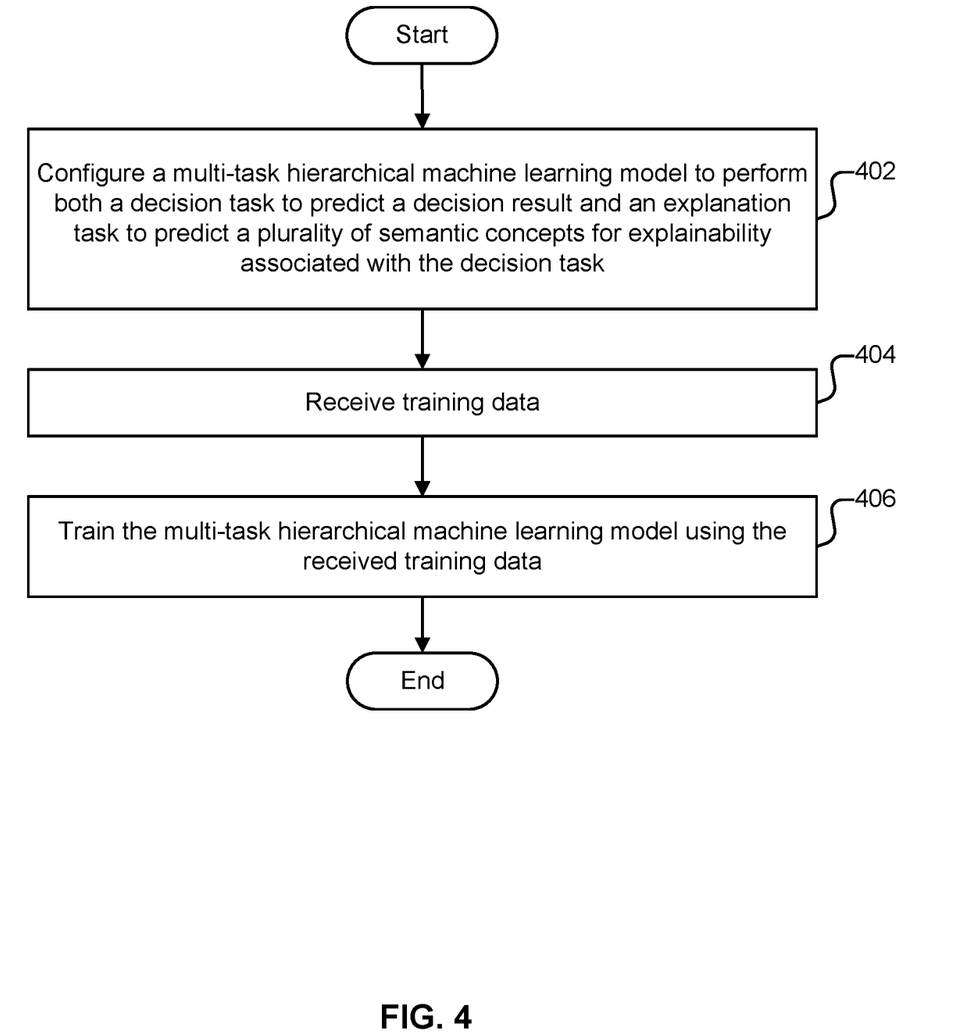
FIG. 4 is a flow diagram illustrating an embodiment of a process for configuring a machine learning model to perform both a decision task and an explanation task.

FIG. 4 is a flow diagram illustrating an embodiment of a process for configuring a machine learning model to perform both a decision task and an explanation task. In some embodiments, the process of FIG. 4 is performed by computer system 700 of FIG. 7. In some embodiments, the machine learning model configured is neural network 100 of FIG. 1A, machine learning model 204 of FIG. 2, and/or machine learning model 320 of FIG. 3.

At 402, a multi-task hierarchical machine learning model is configured to perform both a decision task to predict a decision result and an explanation task to predict a plurality of semantic concepts for explainability associated with the decision task. In some embodiments, a semantic layer of the machine learning model associated with the explanation task is utilized as an input to a subsequent decision layer of the machine learning model associated with the decision task. An example of a decision task to predict a decision result is determining whether a transaction (e.g., a purchase) is fraudulent or not fraudulent (e.g., a yes/no determination or a fraud likelihood score between 0 and 1, where κ indicates zero likelihood of fraud and 1 indicates 100% likelihood of fraud). An example of an accompanying explanation task to predict a plurality of semantic concepts is to provide fraud-related factors explaining the fraud determination. For example, a transaction predicted to be fraudulent may be associated with a suspicious billing address, a suspicious customer, and a suspicious payment. Thus, suspicious billing address, suspicious customer, and suspicious payment would be semantic concepts explaining why the transaction was predicted to be fraudulent.

In various embodiments, configuring the machine learning model includes determining an architecture of the machine learning model, e.g., determining a number of hidden layers for a NN and determining connections between the layers, e.g., connections between hidden layers, an explainability layer, and a decision layer. The machine learning model is multi-task because it is configured to perform both the decision task and the explanation task. For example, neural network 100 of FIG. 1A includes an explainability layer that outputs semantic concepts and a decision layer that outputs decisions. Neural network 100 of Figure is also hierarchical because components of neural network 100 are chained sequentially. In particular, in neural network 100, outputs of an L-layer NN are fed as inputs to a semantic layer whose outputs are in turn fed into a decision layer.

At 404, training data is received. In various embodiments, the training data is labeled data in which labels for the decision task are manually generated by humans (golden decision labels). For example, with respect to fraud detection, in various embodiments, the training data includes a plurality of transactions (e.g., purchases) for which features of each transaction, e.g., purchase information such as number of items purchased, shipping address, etc. are received by the machine learning model as inputs as well as a fraud decision label for each transaction. Stated alternatively, in various embodiments, each transaction is known a priori to be either fraudulent or non-fraudulent and is labeled as such by a human in order to train the machine learning model to correctly make fraud decisions based on the inputs. In various embodiments, the training data also includes labels for semantic concepts associated with each training instance. For example, with respect to fraud detection, each purchase transaction may be associated with various fraud concepts (e.g., suspicious billing address, suspicious customer, suspicious payment, etc.) and labeled as to whether these fraud concepts are true or false for each purchase transaction. In some embodiments, at least a portion of the semantic concept labels in the training data are generated automatically (e.g., based on specified rules that map features of each training instance to concepts). In some embodiments, at least a portion of the semantic concept labels in the training data are generated manually by humans, though automatically generated semantic concept labels typically greatly exceed manually generated semantic concept labels. In some embodiments, at least a portion of the semantic concept labels are generated via expert review of outputs of the machine learning model (e.g., at expert review 212 of FIG. 2) to be fed back to the machine learning model for training.

At 406, the multi-task hierarchical machine learning model is trained using the received training data. In various embodiments, the machine learning model is trained to perform the decision task based on golden decision labels and the machine learning model is trained to perform the explanation task based on a combination of noisy and golden semantic concept labels. It is also possible to train based solely on golden semantic concept labels, though it is typically very costly to obtain a sufficient quantity of golden semantic concept labels for effective training. In some embodiments, the training updates an already deployed machine learning model (e.g., human feedback 214 of FIG. 2, which is fed back to machine learning model 204 of FIG. 2). In some embodiments, the training is performed before the machine learning model is deployed in inference mode. Examples of training include the approaches of strategies 306 of FIG. 3.

Figure 5:
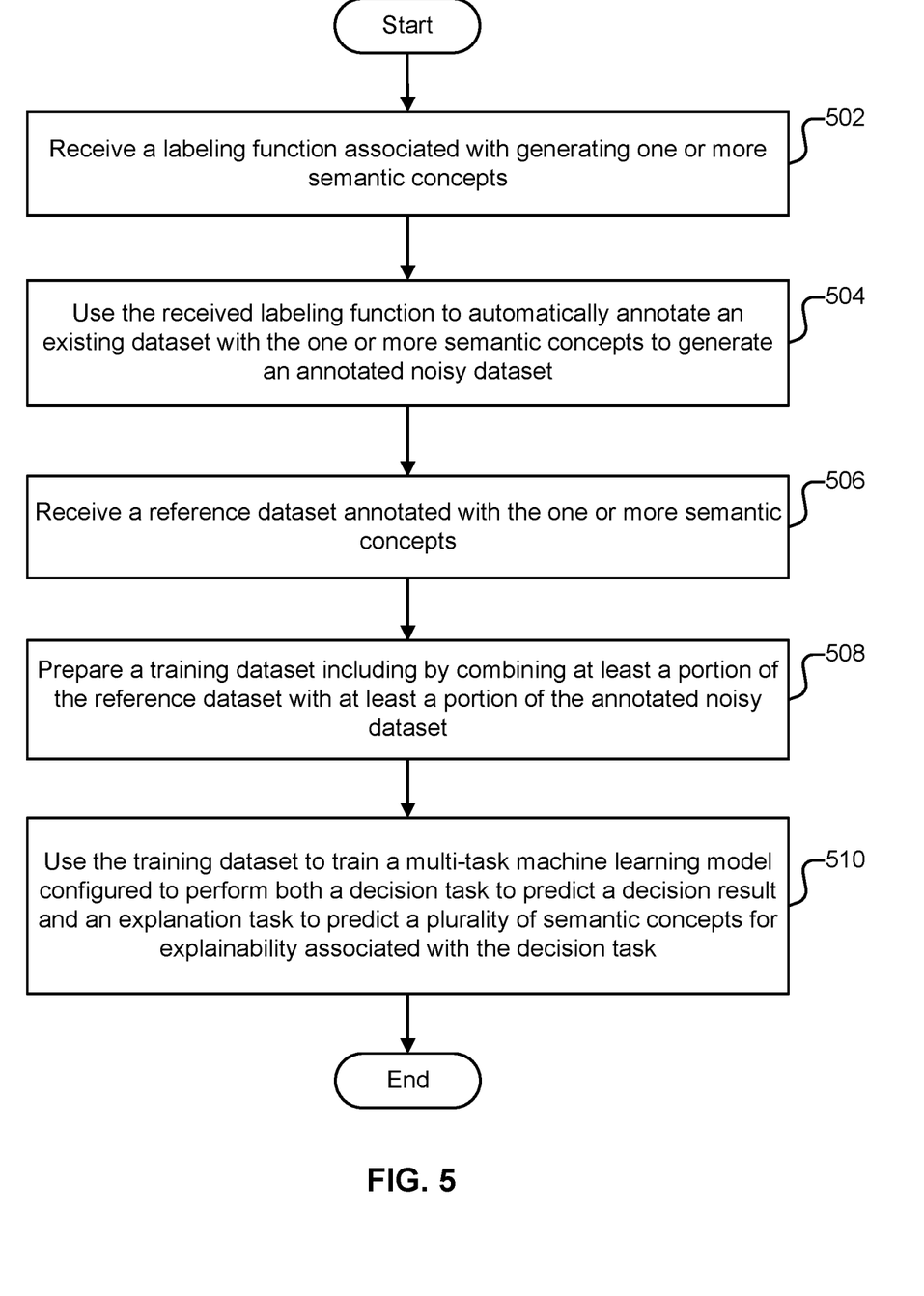
FIG. 5 a flow diagram illustrating an embodiment of a process for training a multi-task machine learning model to perform an explanation task.

FIG. 5 a flow diagram illustrating an embodiment of a process for training a multi-task machine learning model to perform an explanation task. In some embodiments, the process of FIG. 5 is performed by computer system 700 of FIG. 7. In some embodiments, the multi-task machine learning model is neural network 100 of FIG. 1A, machine learning model 204 of FIG. 2, and/or machine learning model 320 of FIG. 3. In some embodiments, at least a portion of the process of FIG. 5 is performed in 406 of FIG. 4.

At 502, a labeling function associated with generating one or more semantic concepts is received. The labeling function can be a rule(s) mapping or any other heuristic or technique to automatically label concepts. In some embodiments, the labeling function is a mapping. In some embodiments, the mapping comprises one or more rules that transform data patterns to explanations in the form of high-level concepts that are more easily understood by humans. An example of a mapping is the rule that if a purchaser associated with a transaction has used a specified number N different credit cards over a specified period of time (e.g., one week), the concept "suspicious customer" is identified for the transaction. A single mapping may be linked with more than one concept. For example, the pattern of a purchaser having used a specified number N different credit cards over a specified period of time can also trigger identification of the concept "suspicious payment".

At 504, the received labeling function is used to automatically annotate an existing dataset with the one or more semantic concepts to generate an annotated noisy dataset. In various embodiments, the existing dataset is already labeled with decision task outputs. For example, a fraud detection dataset may include millions of payment transactions for which each transaction includes purchase information (e.g., number of items, shipping address, etc.) and a fraud decision label (e.g., fraudulent or not fraudulent). The fraud detection dataset can be leveraged to obtain millions of semantic concepts labeled instances by applying the received labeling function to the purchase transaction data of the fraud detection dataset (e.g., apply rules to already existing information about purchases in the fraud detection dataset). Stated alternatively, it is possible to obtain millions of explanation task labeled instances by leveraging the data from which millions of decision task labeled instances are obtained. Using the labeling function to automatically annotate the existing dataset results in noisy labels (the annotated noisy dataset) because automatic annotation via the received labeling function is typically less precise than manual annotation by human experts.

At 506, a reference dataset annotated with the one or more semantic concepts is received. In various embodiments, the reference dataset is annotated manually by human experts. Stated alternatively, in various embodiments, the reference dataset is comprised of golden semantic concept labels. Typically, the reference dataset is much smaller than the annotated noisy dataset because it is significantly more time-consuming and resource-intensive to manually annotate semantic concepts as opposed to automatic annotation. An advantage of the reference dataset over the annotated noisy dataset is that the labels of the reference dataset are more precise and accurate due to the more resource-intensive human expert manual labeling process.

At 508, a training dataset is prepared including by combining at least a portion of the reference dataset with at least a portion of the annotated noisy dataset. In some embodiments, the training dataset is comprised of a plurality of sections. For example, a first section may be comprised of at least a portion of the annotated noisy dataset, corresponding to a first training stage using noisy labels (e.g., stage 314 of FIG. 3), and a second section may be comprised of at least a portion of the reference dataset or a combination of at least a portion of the reference dataset and at least a portion of the annotated noisy dataset, corresponding to a second training stage using noisy labels or a combination of noisy labels and golden labels (e.g., stage 316 of FIG. 3). In alternative embodiments, the training dataset does not have a plurality of sections. For example, a section that is comprised of at least a portion of the reference dataset and at least a portion of the annotated noisy dataset can correspond to a hybrid training approach in which noisy labels and golden labels are combined (e.g., interleaved) in a single training stage (e.g., corresponding to approach 318 of FIG. 3).

At 510, the training dataset is used to train a multi-task machine learning model configured to perform both a decision task to predict a decision result and an explanation task to predict a plurality of semantic concepts for explainability associated with the decision task. In some embodiments, the multi-task machine learning model is neural network 100 of FIG. 1A, machine learning model 204 of FIG. 2, and/or machine learning model 320 of FIG. 3. In some embodiments, the decision result is (for each purchase transaction) whether the purchase transaction is fraudulent or non-fraudulent and the plurality of semantic concepts provide human-interpretable reasons for the decision result.

The process of FIG. 5 is illustrative and not restrictive. Other embodiments for training a multi-task machine learning model are also possible. Furthermore, no sequential order for 502, 504, 506, 508, and 510 is implied in the process of FIG. 5. For example, 504 and 506 may occur in parallel, 506 may occur before 502 and 504, and so forth.

Figure 6A:
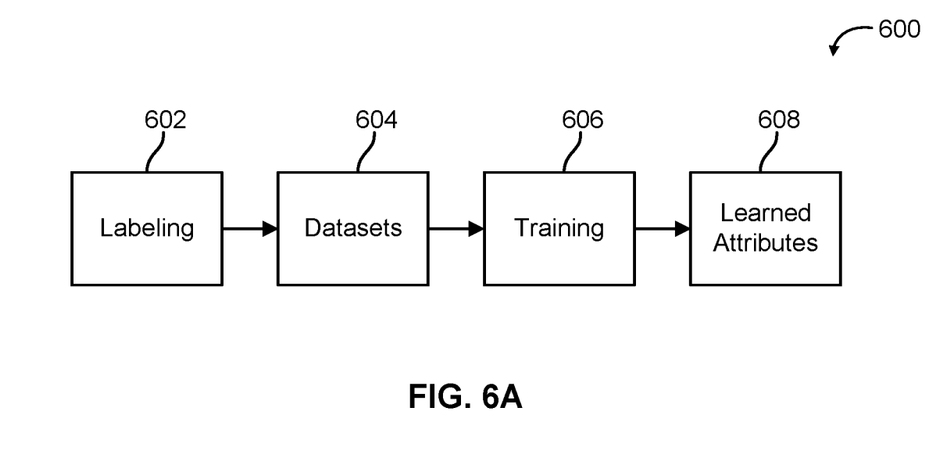
FIG. 6A is a high-level block diagram of an embodiment of a machine learning based framework for learning attributes associated with datasets.

FIG. 6A is a high-level block diagram of an embodiment of a machine learning based framework for learning attributes associated with datasets. In some embodiments, framework 600 is utilized to train a machine learning model to perform a decision task and/or an explanation task. For example, the decision task may be to predict whether transactions are fraudulent or non-fraudulent and the explanation task may be to provide reasons explaining the fraud predictions in the form of high-level concepts that are more easily understood by humans. For fraud detection, in many cases, datasets 604 comprise collections of purchase transaction data (e.g., for each transaction: number of items purchased, shipping address, amount spent, etc.). These datasets are populated and categorized via labeling 602. For example, transactions that are fraudulent may be manually grouped and labeled by domain experts, as are transactions that are non-fraudulent. Fraud concepts may be grouped and labeled manually and/or automatically.

Datasets 604 are tagged with comprehensive sets of labels or metadata. With respect to fraud detection, a set of labels defined and/or selected for purchase transactions of a prescribed dataset may include one or more high-level labels that provide classification of the purchase transactions and may furthermore include lower-level labels comprising ground truth data associated with fraud status and semantic concepts in a fraud taxonomy. Datasets 604 are utilized for artificial intelligence learning. Training 606 performed on datasets 604, for example, using any combination of one or more appropriate machine learning techniques such as deep neural networks and convolutional neural networks, results in a set of one or more learned attributes 608. Such attributes may be derived or inferred from labels of datasets 604. For example, a learned attribute may be that transactions associated with certain IP addresses are likely to be fraudulent. In various embodiments, different training models may be used to learn different attributes. Furthermore, framework 600 may be utilized with respect to a plurality of different training datasets. After training on large sets of data to learn various attributes, framework 650 of FIG. 6B may subsequently be deployed to detect similar attributes or combinations thereof in other datasets for which such attributes are unknown.

Figure 6B:
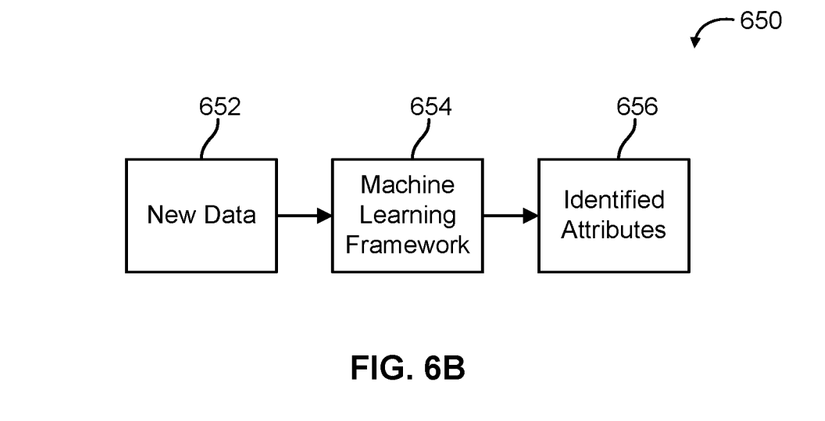
FIG. 6B is a high-level block diagram of an embodiment of a machine learning based framework for identifying data attributes.

FIG. 6B is a high-level block diagram of an embodiment of a machine learning based framework for identifying data attributes. In some embodiments, framework 650 is utilized to detect fraud in purchase transactions (e.g., online transactions and/or transactions in which a credit card is used). Framework 650 operates on new data 652. New data 652 may comprise a plurality of purchase transactions. New data 652 is not labeled or tagged, e.g., with ground truth data. New data 652 is processed by machine learning framework 654 to determine identified attributes 656.

In many cases, machine learning framework 654 is trained on large labeled datasets comprising a substantial subset of, if not all, possible permutations of objects of a constrained set of possible objects associated with purchase transactions in order to learn associated attributes and combinations thereof and which may subsequently be employed to detect or identify such attributes in other collections of purchase transaction. In some embodiments, identified attributes 656 include identified semantic concepts explaining fraud status predictions.

Figure 7:
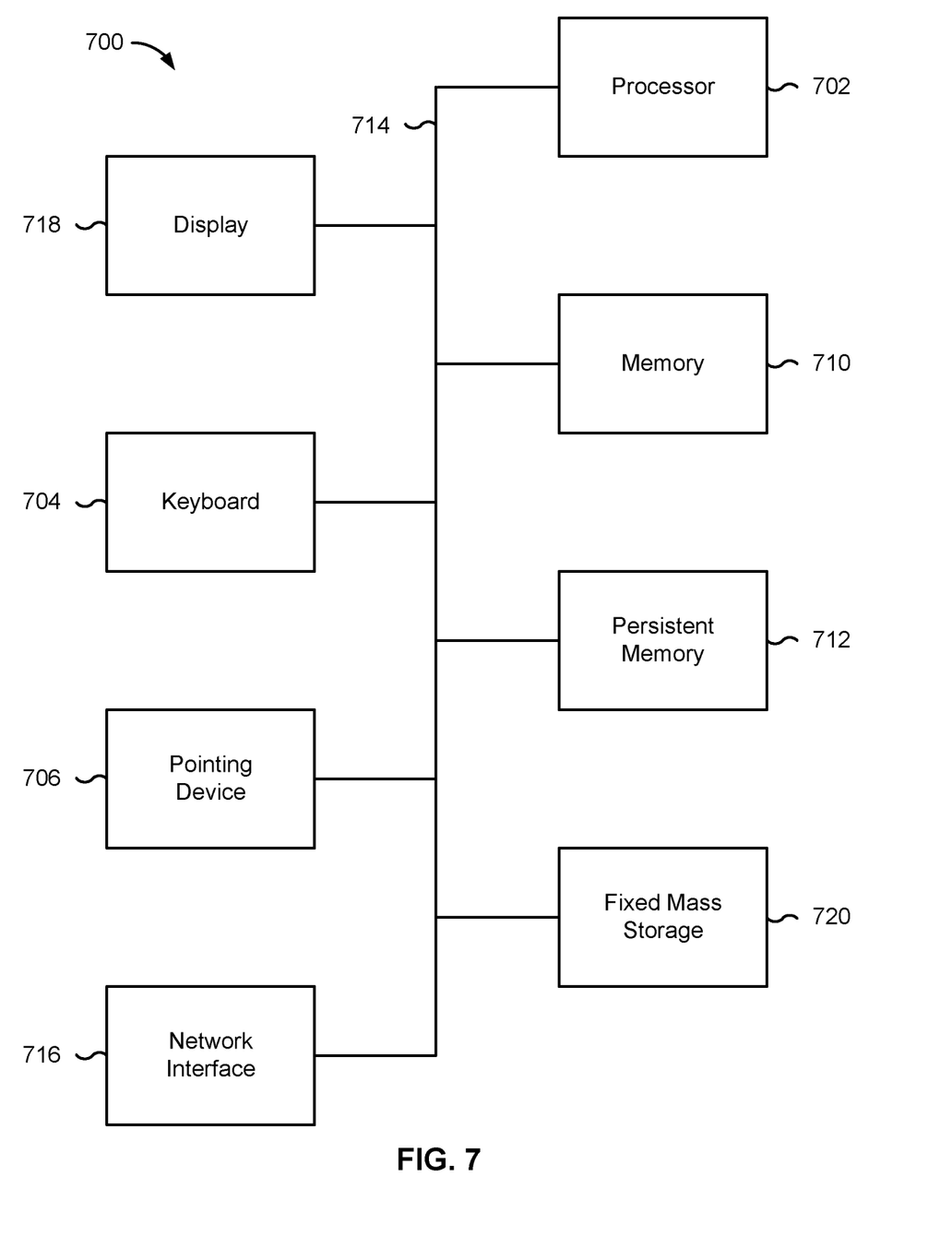
FIG. 7 is a functional diagram illustrating a programmed computer system.

FIG. 7 is a functional diagram illustrating a programmed computer system. In some embodiments, the processes of FIG. 4 and/or FIG. 5 are executed by computer system 700. In some embodiments, neural network 100 of FIG. 1A, machine learning model 204 of FIG. 2, and/or machine learning model 320 of FIG. 3 is configured and/or trained using computer system 700.

In the example shown, computer system 700 includes various subsystems as described below. Computer system 700 includes at least one microprocessor subsystem (also referred to as a processor or a central processing unit (CPU)) 702. Computer system 700 can be physical or virtual (e.g., a virtual machine). For example, processor 702 can be implemented by a single-chip processor or by multiple processors. In some embodiments, processor 702 is a general-purpose digital processor that controls the operation of computer system 700. Using instructions retrieved from memory 710, processor 702 controls the reception and manipulation of input data, and the output and display of data on output devices (e.g., display 718).

Processor 702 is coupled bi-directionally with memory 710, which can include a first primary storage, typically a random-access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 702. Also, as is well known in the art, primary storage typically includes basic operating instructions, program code, data, and objects used by the processor 702 to perform its functions (e.g., programmed instructions). For example, memory 710 can include any suitable computer-readable storage media, described below, depending on whether, for example, data access needs to be bi-directional or uni-directional. For example, processor 702 can also directly and very rapidly retrieve and store frequently needed data in a cache memory (not shown).

Persistent memory 712 (e.g., a removable mass storage device) provides additional data storage capacity for computer system 700, and is coupled either bi-directionally (read/write) or uni-directionally (read only) to processor 702. For example, persistent memory 712 can also include computer-readable media such as magnetic tape, flash memory, PC-CARDS, portable mass storage devices, holographic storage devices, and other storage devices. A fixed mass storage 720 can also, for example, provide additional data storage capacity. The most common example of fixed mass storage 720 is a hard disk drive. Persistent memory 712 and fixed mass storage 720 generally store additional programming instructions, data, and the like that typically are not in active use by the processor 702. It will be appreciated that the information retained within persistent memory 712 and fixed mass storages 720 can be incorporated, if needed, in standard fashion as part of memory 710 (e.g., RAM) as virtual memory.

In addition to providing processor 702 access to storage subsystems, bus 714 can also be used to provide access to other subsystems and devices. As shown, these can include a display monitor 718, a network interface 716, a keyboard 704, and a pointing device 706, as well as an auxiliary input/output device interface, a sound card, speakers, and other subsystems as needed. For example, pointing device 706 can be a mouse, stylus, track ball, or tablet, and is useful for interacting with a graphical user interface.

Network interface 716 allows processor 702 to be coupled to another computer, computer network, or telecommunications network using a network connection as shown. For example, through network interface 716, processor 702 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 702 can be used to connect computer system 700 to an external network and transfer data according to standard protocols. Processes can be executed on processor 702, or can be performed across a network such as the Internet, intranet networks, or local area networks, in conjunction with a remote processor that shares a portion of the processing. Additional mass storage devices (not shown) can also be connected to processor 702 through network interface 716.

An auxiliary I/O device interface (not shown) can be used in conjunction with computer system 700. The auxiliary I/O device interface can include general and customized interfaces that allow processor 702 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 7 is but an example of a computer system suitable for use with the various embodiments disclosed herein. Other computer systems suitable for such use can include additional or fewer subsystems. In addition, bus 714 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving a labeling function associated with generating one or more semantic concepts;
   receiving a reference dataset manually annotated with the one or more semantic concepts;
   using the received labeling function to automatically annotate an existing dataset with the one or more semantic concepts to generate an annotated noisy dataset, wherein the annotated noisy dataset includes annotations with less precision than annotations included in the reference dataset and at least one of the annotations in the annotated noisy dataset is generated without using human-supplied labels;
   preparing a training dataset including by combining at least a portion of the reference dataset with at least a portion of the annotated noisy dataset;
   providing the training dataset to a multi-task machine learning model at least prior to deployment of the multi-task machine learning model; and
   using the training dataset to train a multi-task machine learning model, wherein the multi-task machine learning model is configured to:
      automatically perform a decision task that outputs a decision result; and
      automatically perform an explanation task that outputs at least one of the one or more semantic concepts, wherein the at least one of the one or more semantic concepts is a natural language explanation, understandable by a user, describing a reason for the decision result.

2. The method of claim 1, wherein the labeling function corresponds to a fraud detection rule for identifying specified data patterns.

3. The method of claim 1, wherein the existing dataset includes information associated with a plurality of purchase transactions, including, for each purchase transaction of the plurality of purchase transactions, a set of labeled purchase-related features and a labeled outcome as to whether non-legitimate financial or account activity is present.

4. The method of claim 1, wherein the reference dataset is a ground-truth dataset whose one or more semantic concepts are annotated manually by one or more annotators selected to meet specified accuracy criteria associated with identifying the one or more semantic concepts.

5. The method of claim 1, wherein at least a portion of the reference dataset is annotated with the one or more semantic concepts during review of outputs of the multi-task machine learning model after it is deployed to perform the decision task and the explanation task.

6. The method of claim 1, wherein the training dataset is comprised of a plurality of subgroupings of data corresponding to a plurality of training stages.

7. The method of claim 6, wherein the training dataset includes a first subgrouping of data, corresponding to a first training stage, comprised of data from the annotated noisy dataset.

8. The method of claim 7, wherein the training dataset includes a second subgrouping of data, corresponding to a second training stage, comprised of data from the reference dataset.

9. The method of claim 7, wherein the training dataset includes a second subgrouping of data, corresponding to a second training stage, comprised of a mixture of data from the annotated noisy dataset and data from the reference dataset.

10. The method of claim 1, wherein using the training dataset to train the multi-task machine learning model includes pre-training the multi-task machine learning model to perform the explanation task using training instances from the annotated noisy dataset and, subsequently, fine-tuning the multi-task machine learning model using training instances from the reference dataset.

11. The method of claim 1, wherein using the training dataset to train the multi-task machine learning model includes pre-training the multi-task machine learning model to perform the explanation task using training instances from the annotated noisy dataset and, subsequently, fine-tuning the multi-task machine learning model using a mixture of training instances from the annotated noisy dataset and training instances from the reference dataset.

12. The method of claim 1, wherein using the training dataset to train the multi-task machine learning model includes using a mixture of training instances from the annotated noisy dataset and training instances from the reference dataset, in a single training stage approach, to train the multi-task machine learning model to perform the explanation task.

13. The method of claim 1, wherein the decision task is associated with detection of a fraudulent transaction, money laundering, account takeover, or account-opening fraud.

14. The method of claim 1, wherein the decision result encodes a fraud risk likelihood associated with a transaction.

15. The method of claim 1, wherein the one or more semantic concepts belong to a taxonomy of fraud concepts.

16. The method of claim 1, wherein the multi-task machine learning model utilizes a neural network, Bayes, nearest neighbor, decision tree, regression, or support vector machine technique.

17. The method of claim 1, wherein the multi-task machine learning model includes a decision layer associated with the decision task and a separate semantic layer associated with the explanation task.

18. The method of claim 17, wherein the semantic layer is utilized as an input to the decision layer.

19. A system, comprising:
one or more processors configured to:
receive a labeling function associated with generating one or more semantic concepts;
receive a reference dataset manually annotated with the one or more semantic concepts;
use the received labeling function to automatically annotate an existing dataset with the one or more semantic concepts to generate an annotated noisy dataset, wherein the annotated noisy dataset includes annotations with less precision than annotations included in the reference dataset and at least one of the annotations in the annotated noisy dataset is generated without using human-supplied labels;
prepare a training dataset including by combining at least a portion of the reference dataset with at least a portion of the annotated noisy dataset;
provide the training dataset to a multi-task machine learning model at least prior to deployment of the multi-task machine learning model; and
use the training dataset to train a multi-task machine learning model, wherein the multi-task machine learning model is configured to:
automatically perform a decision task that outputs a decision result; and
automatically perform an explanation task that outputs at least one of the one or more semantic concepts, wherein the at least one of the one or more semantic concepts is a natural language explanation, understandable by a user, describing a reason for the decision result; and
a memory coupled to at least one of the one or more processors and configured to provide at least one of the one or more processors with instructions.

20. A computer program product embodied in a non-transitory computer readable medium and comprising computer instructions for:
receiving a labeling function associated with generating one or more semantic concepts;
receiving a reference dataset manually annotated with the one or more semantic concepts;
using the received labeling function to automatically annotate an existing dataset with the one or more semantic concepts to generate an annotated noisy dataset, wherein the annotated noisy dataset includes annotations with less precision than annotations included in the reference dataset and at least one of the annotations in the annotated noisy dataset is generated without using human-supplied labels;
preparing a training dataset including by combining at least a portion of the reference dataset with at least a portion of the annotated noisy dataset;
providing the training dataset to a multi-task machine learning model at least prior to deployment of the multi-task machine learning model; and
using the training dataset to train a multi-task machine learning model, wherein the multi-task machine learning model is configured to:
automatically perform a decision task that outputs a decision result; and
automatically perform an explanation task that outputs at least one of the one or more semantic concepts, wherein the at least one of the one or more semantic concepts is a natural language explanation, understandable by a user, describing a reason for the decision result.

21. The method of claim 1, wherein automatically annotating the existing dataset with the one or more semantic concepts to generate the annotated noisy dataset includes applying at least one rule to determine labels for the existing dataset without using human-supplied labels.

* * * * *